US008312611B2

(12) United States Patent
Tobita et al.

(10) Patent No.: US 8,312,611 B2
(45) Date of Patent: Nov. 20, 2012

(54) ASSEMBLING METHOD AND APPARATUS FOR ASSEMBLY, AND ASSEMBLING METHOD AND APPARATUS FOR WORKPIECE

(75) Inventors: Tadashi Tobita, Tochigi (JP); Shinji Yoshino, Tochigi (JP); Kenjiro Tsutsumi, Tochigi (JP); Masashi Sato, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 586 days.

(21) Appl. No.: 12/533,382

(22) Filed: Jul. 31, 2009

(65) Prior Publication Data

US 2010/0031489 A1 Feb. 11, 2010

(30) Foreign Application Priority Data

Aug. 8, 2008 (JP) ................................. 2008-206234
Aug. 8, 2008 (JP) ................................. 2008-206235

(51) Int. Cl.
*B21D 39/03* (2006.01)
*B25B 27/14* (2006.01)
(52) U.S. Cl. ........................................ 29/430; 29/281.5
(58) Field of Classification Search .................... 29/430, 29/428, 281.5, 431, 429, 707, 711, 721, 757, 29/760, 783, 823, 897.2; 228/102; 414/222.03
See application file for complete search history.

(56) References Cited

U.S. PATENT DOCUMENTS 4,764,077 A * 8/1988 Susnjara .................. 414/222.03
6,336,582 B1 * 1/2002 Kato et al. ..................... 228/102

FOREIGN PATENT DOCUMENTS

| JP | 5-169335 | 7/1993 |
| JP | 09-193858 | 7/1997 |
| JP | 2001-205485 | 7/2001 |
| JP | 2001-225242 | 8/2001 |

* cited by examiner

*Primary Examiner* — John C Hong
(74) *Attorney, Agent, or Firm* — Rankin, Hill & Clark LLP (57) ABSTRACT

A first holding frame of a component holding unit is allowed to hold a plurality of components composing a first assembly and a second holding frame of the component holding unit is allowed to hold a plurality of components composing a second assembly which is to be mounted on the first assembly. The first assembly held onto the first holding frame and the second assembly held onto the second holding frame are assembled by an assembly work unit. The second holding frame is allowed to reciprocate towards the first holding frame to pass the second assembly from the second holding, frame to the first holding frame. Thereafter, the first assembly and the second assembly which are held onto the first holding frame are assembled and coupled together by the assembly work unit.

6 Claims, 9 Drawing Sheets

ASSEMBLING METHOD AND APPARATUS FOR ASSEMBLY, AND ASSEMBLING METHOD AND APPARATUS FOR WORKPIECE

This application claims priority from Japanese Patent Application No. 2008-206234, filed on Aug. 8, 2008, and Japanese Patent Application No. 2008-206235, filed on Aug. 8, 2008, the entire contents of which are hereby incorporated by reference.

FIELD OF THE INVENTION

The present invention relates to an assembling method and an assembling apparatus for an assembly from a plurality of components.

The present invention further relates to an assembling method and an assembling apparatus for a workpiece.

DESCRIPTION OF RELATED ART

An Japanese Laid-Open Patent Publication No. H05-169335 (Hereinafter, Patent Document 1) discloses an related art apparatus in which a rear fender which is a mounting component of a vehicle is supported by a support member and loaded in a welding position and a component is welded to the rear fender by a welding robot, whereby a rear fender assembly is assembled. By holding a rear fender and an attachment component thereof in an assembling area (work station) for the welding robot, a rear fender assembly can be efficiently assembled.

Meanwhile, for example, in an assembly formed by joining a dashboard upper part and a windshield together, such as a dashboard assembly which is a mounting component of a vehicle, components need to be mounted in advance on each of the dashboard upper part and the windshield. Namely, components that are to be attached to locations inside a dashboard assembly cannot be attached after a dashboard upper part and a windshield are joined together. Thus, a dashboard upper part assembly (first assembly) having components attached to the dashboard upper part and a windshield assembly (second assembly) having components attached to the windshield are individually assembled and then the two assemblies are joined together, whereby a dashboard assembly (third assembly) is formed.

When assembling a plurality of assemblies in the above-described manner, however, since the apparatus described in Patent Document 1 assemblies only a single assembly, assembling of a plurality of assemblies requires a plurality of work stations. Accordingly, loading of components and unloading of an assembly are required for each work station, and furthermore, an assembly needs to be transported between the work stations. Due to this the line configuration becomes large and thus the cost increases and in addition the amount of time required for loading/unloading and transport increases, resulting in poor work efficiency.

Patent Document: 1 also discloses a related-art apparatus including: two work stations respectively having workpiece supports; and one welding robot that moves along the two work stations. In the related-art, while welding and assembly of a workpiece are performed by the welding robot at one of the work stations, a workpiece is set on the workpiece support at the other work station.

When a workpiece is composed of numbers of components, however, work for setting the components on a workpiece support requires a great amount of time. Hence, even when welding and assembly of a workpiece by the welding robot is completed at one of the work stations, setting of a workpiece on a workpiece support at the other work station is not completed. Accordingly, during this period, work by the welding robot goes into a non-operating state, thereby decreasing work efficiency.

Also, when welding and assembly of a workpiece of components that differ between the two work stations are performed, not only the amount of time required to set a workpiece but also the number of man-hours required for welding work differ between the work stations. Accordingly, the difference in the amount of time required for work between the two work stations is large, thereby significantly decreasing work efficiency.

SUMMARY OF INVENTION

Illustrative aspects of the present invention provide an assembling method and an assembling apparatus for an assembly that are capable of preventing an increase in cost and obtaining high work efficiency by making the line configuration compact, even when assembling a plurality of assemblies on an assembly-by-assembly basis and thereafter the assembling of the assemblies which are joined together is performed.

Illustrative aspects of the present invention further provide an assembling method and an assembling apparatus for a workpiece that are capable of efficiently assembling of workpieces components by reducing the amount of time for a non-operating state between work stations.

According to an illustrative aspect of the invention, an assembling method for an assembly is provided with: a component holding step of allowing a component holding unit to hold a plurality of components composing the assembly; and an assembling step of allowing an assembly work unit to assemble the components. The component holding step includes: a first holding step of allowing a first holding frame provided to the component holding unit to hold a plurality of components composing a first assembly; and a second holding step of allowing a second holding frame to hold a plurality of components composing a second assembly which is to be mounted on the first assembly, the second holding frame being provided to the component holding unit and being reciprocable towards the first holding frame. The assembling step includes: a first assembly forming step of assembling and coupling the components of the first assembly held onto the first holding frame, by the assembly work unit, whereby the first assembly is formed; a second assembly forming step of assembling and coupling the components of the second assembly held onto the second holding frame, by the assembly work unit, whereby the second assembly is formed; a third holding step of allowing the second holding frame to reciprocate towards the first holding frame to pass the second assembly held onto the second holding frame to the first holding frame, whereby the first assembly and the second assembly are held onto the first holding frame with the first assembly and the second assembly being mounted on top of each other; and a third assembly forming step of assembling and coupling together the first assembly and the second assembly which are held onto the first holing frame, by the assembly work unit, whereby a third assembly is formed.

According to another illustrative aspect of the invention, an assembling method for a workpiece is provided with: a workpiece setting step of setting a plurality of workpiece components composing the workpiece, on a workpiece support; and an assembling step of loading the workpiece support on which the workpiece components are set in the workpiece setting step, into a work station to assemble the workpiece by an assembly work unit. At least three work stations are provided, the method further comprises a moving step of selectively moving the assembly work unit to any of the work stations, the assembling step is performed at the any of the work stations by the assembly work unit having been moved in the moving step, the workpiece setting step is performed at other work stations than the work station where the assembling step is performed, and in the moving step, the assembly work unit is caused to move to another work station where the workpiece setting step is completed at a point in time when the assembling step at the work station is completed.

Other aspects and advantages of the invention will be apparent from the following description, the drawings and the claims.

DETAILED DESCRIPTION OF EXEMPLARY EMBODIMENTS

Figure 1:
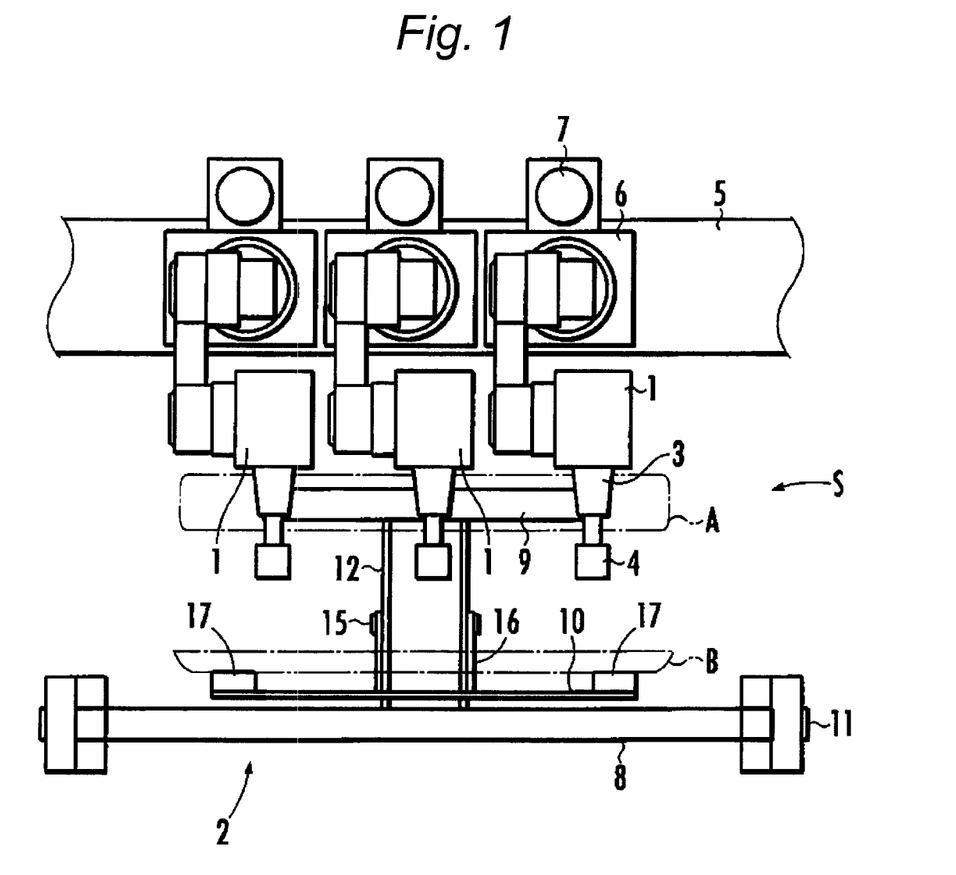
FIG. 1 is a plan view showing an assembly apparatus according to a first exemplary embodiment of the present invention.
Figure 3:
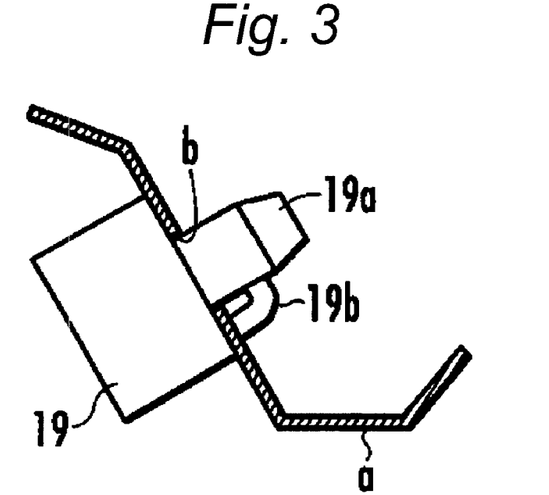
FIG. 3 is an illustrative view showing an example of a clamping unit.
Figure 4:
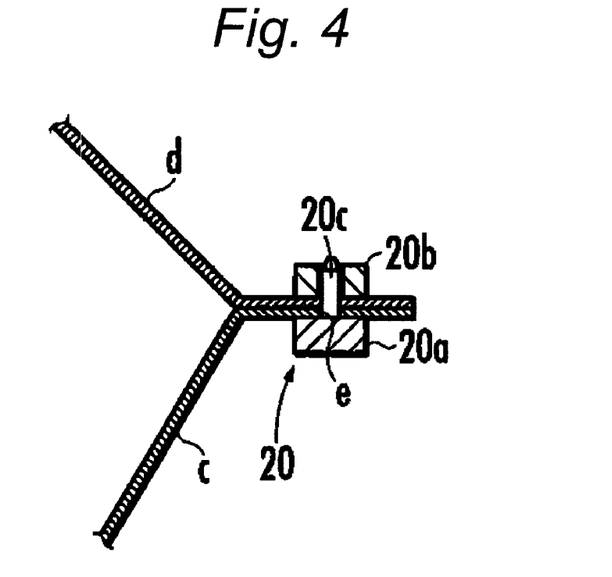
FIG. 4 is an illustrative view showing another example of the clamping unit.

A first exemplary embodiment of the present invention will be described based on FIGS. 1 to 6B. FIG. 1 is a plan view showing an assembly apparatus according to the first exemplary embodiment, FIG. 2 is a perspective view showing a component holding unit according to the first exemplary embodiment, FIGS. 3 and 4 are illustrative views showing clamping units, and FIGS. 5A, 5B, 6A, and 6B are illustrative views of the operation of the component holding unit.

An assembly apparatus according to the first exemplary embodiment welds and assembles, for example, a plurality of components of an assembly such as a dashboard assembly which is mounted on a vehicle. As shown in FIG. 1, the assembly apparatus includes a plurality of welding robots 1 (assembly work units) and a component holding unit 2 that holds a plurality of components composing assemblies, in an assembly work area S for the welding robots 1.

Each welding robot 1 includes an articulated arm 3 and a welding gun 4 connected to an end of the articulated arm 3. The welding robots 1 all have substantially the same configuration. Each welding robot 1 is mounted on a moving stage 6 that moves along a moving path 5, and moves between a plurality of work stations provided along the moving path 5, by driving a drive motor 7 provided on the moving stage 6. FIG. 1 shows one work station and shows a state in which at the work station three welding robots 1 stop on the moving path 5 and are welding and assembling the assembly.

Figure 2:
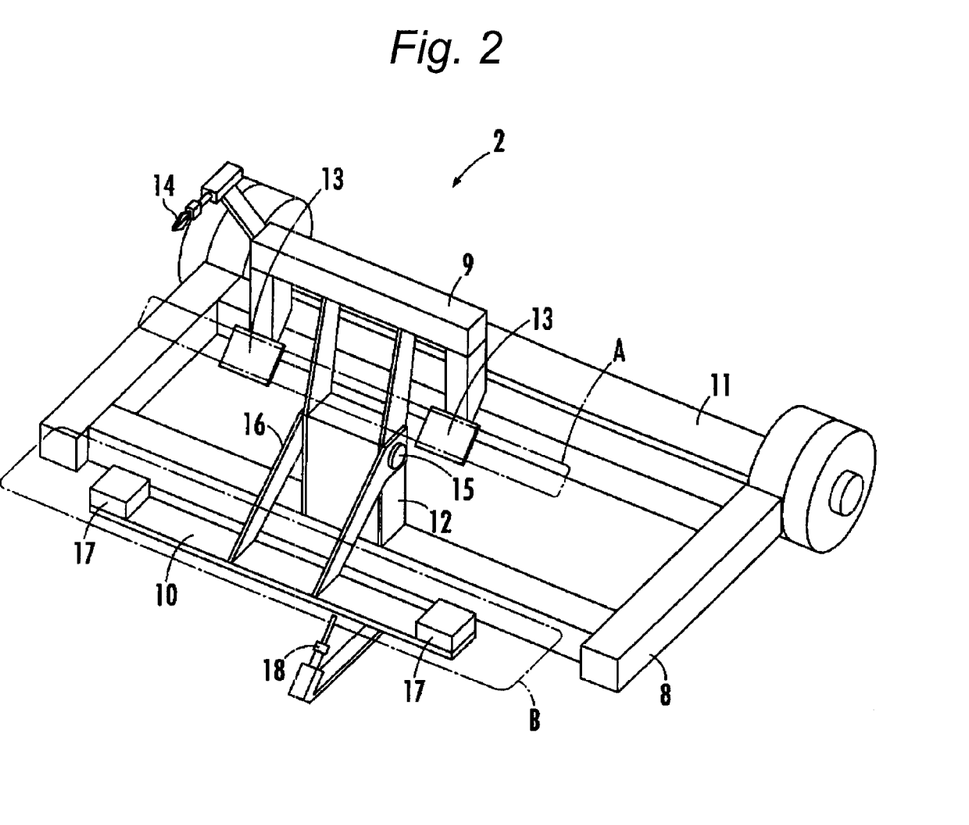
FIG. 2 is a perspective view showing a component holding unit according to the first exemplary embodiment.

As shown in FIG. 2, the component holding unit 2 includes a main frame 8, a first holding frame 9, and a second holding frame 10. The main frame 8 is a rectangular framework and is provided with a reciprocating shaft 11 on one side of the main frame 8 and thus is reciprocable relative to a floor. Though not shown, the reciprocating of the main frame 8 is driven by a drive motor connected to the reciprocating shaft 11 through a rotation transmission mechanism such as a reduction gear.

The first holding frame 9 is provided at an end of a connecting arm 12 provided upright on the main frame 8. The first holding frame 9 includes support pads 13 that support a first assembly A (in the first exemplary embodiment, a dashboard upper part and an attachment component of the dashboard upper part). The first assembly A supported by the support pads 13 is secured and supported by a clamping unit 14 provided to the first holding frame 9. Although FIG. 2 shows only one clamping unit 14, numbers of clamping units (not shown) are provided at appropriate locations. By these clamping units, the first assembly A or numbers of components composing the first assembly A can be held, even when not welded, onto the first holding frame 9 without dropping off.

The second holding frame 10 is provided at an end of a reciprocating arm 16 which is reciprocably connected through a shaft 15 to the connecting arm 12 provided upright on the main frame 8. The reciprocating arm 16 reciprocates in a direction in which the second holding frame 10 is stacked on the first holding frame 9. The reciprocating arm 16 and the shaft 15 compose a reciprocating unit of the present invention.

The second holding frame 10 includes support pads 17 that support a second assembly B (in the first exemplary embodiment, a windshield and an attachment component of the windshield). The second assembly B supported by the support pads 17 is secured and supported by a clamping unit 18 provided to the second holding frame 10. Although FIG. 2 shows only one clamping unit 18 provided to the second holding frame 10, numbers of clamping units (not shown) are provided at appropriate locations. By these clamping units, the second assembly B or numbers of components composing the second assembly B can be held, even when not welded, onto the second holding frame 10 without dropping off. Though not shown, the reciprocating of the reciprocating arm 16 is driven by a cylinder connected between the connecting arm 12 and the reciprocating arm 16.

The first assembly A and the second assembly B each are formed by assembling and coupling a plurality of components by welding. Then, by assembling and coupling the first assembly A and the second assembly B together by welding, a third assembly C (in the first exemplary embodiment, a dashboard assembly formed by joining a dashboard upper part and a windshield) which will be described later is formed.

Numbers of the clamping units are provided to the first holding frame 9 and the second holding frame 10. As shown in FIG. 3, the clamping units are provided with: a pin-type clamping unit 19 that includes a pin 19a which is inserted into a positioning hole b (a pre-provided hole such as a drainage hole is used) of a component a which composes the first assembly A or the second assembly B; and a retaining hook 19b which projects from the pin 19a upon clamping and which is accommodated in the pin 19a upon non-clamping. Although FIG. 3 shows a state in which the clamping unit 19 clamps one component a, the clamping unit 19 can clamp a plurality of components in a stacking manner. As another example of the clamping units, as shown in FIG. 4, there is a sandwich-type clamping unit 20 that sandwiches components c and d by a pair of sandwiching members 20a and 20b and that includes a pin 20c which is inserted into positioning holes e of the components c and d and provided to the sandwiching member 20a.

Figure 5A:
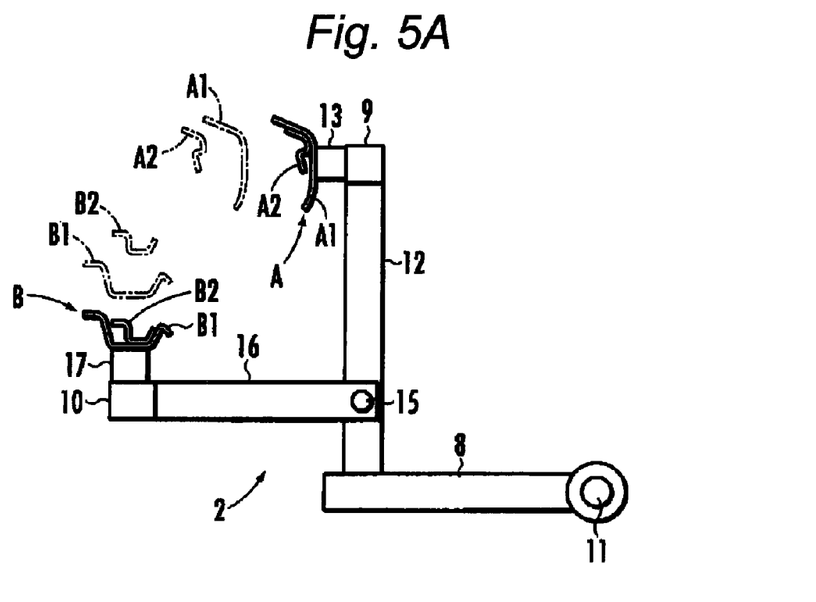
FIGS. 5A and 5B are illustrative views schematically showing the operation of the component holding unit.

Next, an assembling method by the assembly apparatus according to the first exemplary embodiment will be described. First, the component holding unit 2 is brought into the state shown in FIG. 2. As schematically shown in FIG. 5A, the first holding frame 9 is allowed to hold a plurality of components A1 and A2 composing a first assembly A (first holding step) and the second holding frame 10 is allowed to hold a plurality of components B1 and B2 composing a second assembly B (second holding step). The components A1, A2, B1, and B2 are prevented from dropping off from the first holding frame 9 and the second holding frame 10 onto which the components A1, A2, B1, and B2 are secured and supported by the aforementioned clamping units with the components A1, A2, B1, and B2 being positioned.

Figure 5B:
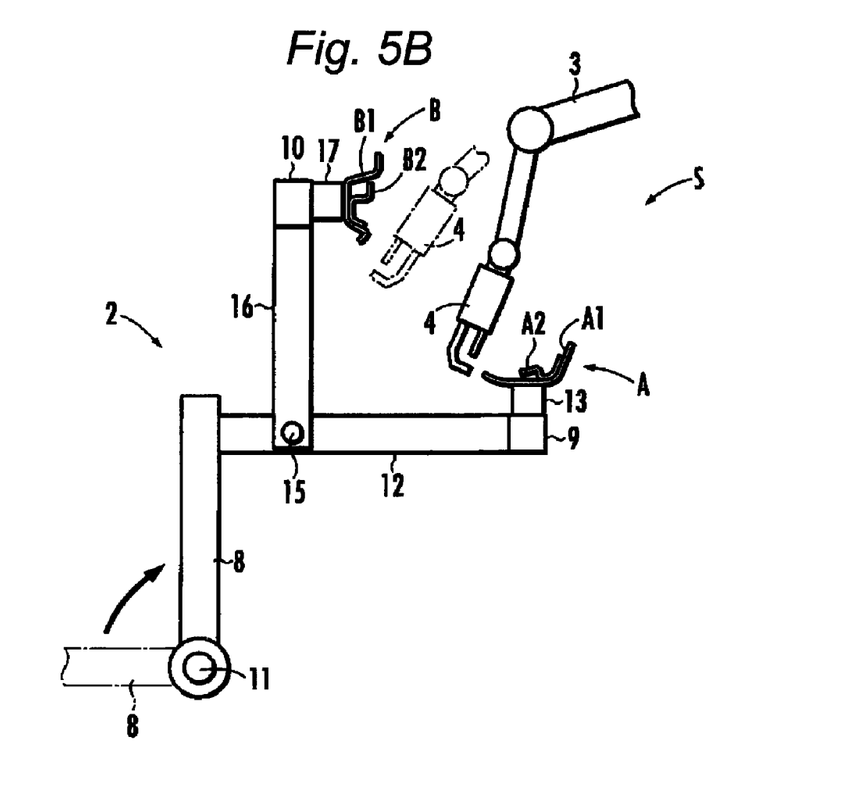

Subsequently, as schematically shown in FIG. 5B, the main frame 8 reciprocates through the reciprocating shaft 11 and accordingly the first holding frame 9 that holds the plurality of components A1 and A2 composing the first assembly A and the second holding frame 10 that holds the plurality of components B1 and B2 composing the second assembly B are positioned in the assembling area S for the welding robots 1 (see the state shown in FIG. 1).

Then, as shown in FIG. 5B, by the welding guns 4 of the welding robots 1, the components A1 and A2 of the first assembly A are welded and are thereby assembled and coupled (first assembly forming step) and similarly the plurality of components B1 and B2 composing the second assembly 13 are welded and are thereby assembled and coupled (second assembly forming step). By this, the first holding frame 9 is in a state of holding the first assembly A into which the plurality of components A1 and A2 are assembled. The second holding frame 10 is in a state of holding the second assembly B into which the plurality of components B1 and B2 are assembled.

Figure 6A:
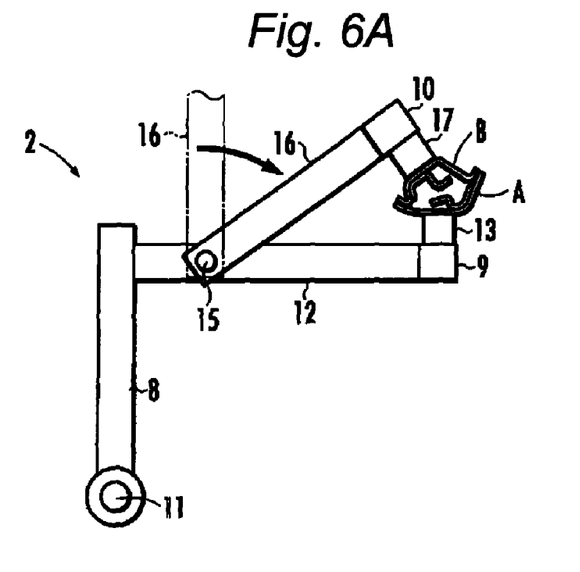
FIGS. 6A and 6B are illustrative views schematically showing the operation of the component holding unit, which are continued from FIGS. 5A and 5B.

Subsequently, as schematically shown in FIG. 6A, the second holding frame 10 being in a state of holding the second assembly B is allowed to reciprocate towards the first holding frame 9 through the reciprocating arm 16. By this, the second assembly B is stacked on the first assembly A held onto the first holding frame 9, with the first assembly A and the second assembly B being mounted on top of each other (being not welded). Then, though not shown, the clamping units of the second holding frame 10 release the clamping and the clamping units of the first holding frame 9 collectively clamp the first assembly A and the second assembly B (third holding step).

Figure 6B:
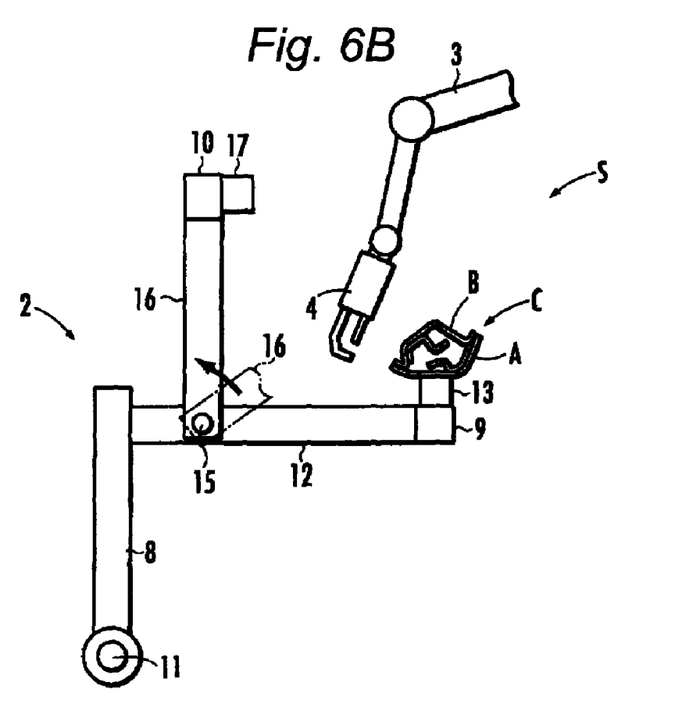

Then, as schematically shown in FIG. 6B, the second holding frame 10 whose holding of the second assembly B is released is caused to reciprocate to its original position (a direction turning away from the first holding frame 9) through the reciprocating arm 16. Then, by the welding guns 4 of the welding robots 1, the first assembly A and the second assembly 13 are welded together and are thereby assembled and coupled (third assembly forming step). By this, a third assembly C into which the first assembly A and the second assembly B are assembled is formed. Thereafter, with reference to FIG. 1, the welding robots 1 move out of the work station and the third assembly C is unloaded from the first holding frame 9.

As described above, according to the assembling apparatus according to the first exemplary embodiment, by providing the component holding unit 2, at a single work station (in one same assembling area S for the welding robots 1), a first assembly A can be assembled, a second assembly B having different components than the first assembly A can be assembled, and a third assembly C in which the second assembly B is coupled to the first assembly A can be assembled. Accordingly, not only an improvement in work efficiency but also elimination of the need for a plurality of work stations for assembling those assemblies are achieved, enabling to make the line configuration compact.

Although the first exemplary embodiment describes an example in which the welding robots 1 perform welding and assembling on a plurality of components, the configuration is not limited thereto; for example, even by using an assembling unit that performs a swaging process, riveting, etc., the same effects can be obtained.

Figure 7:
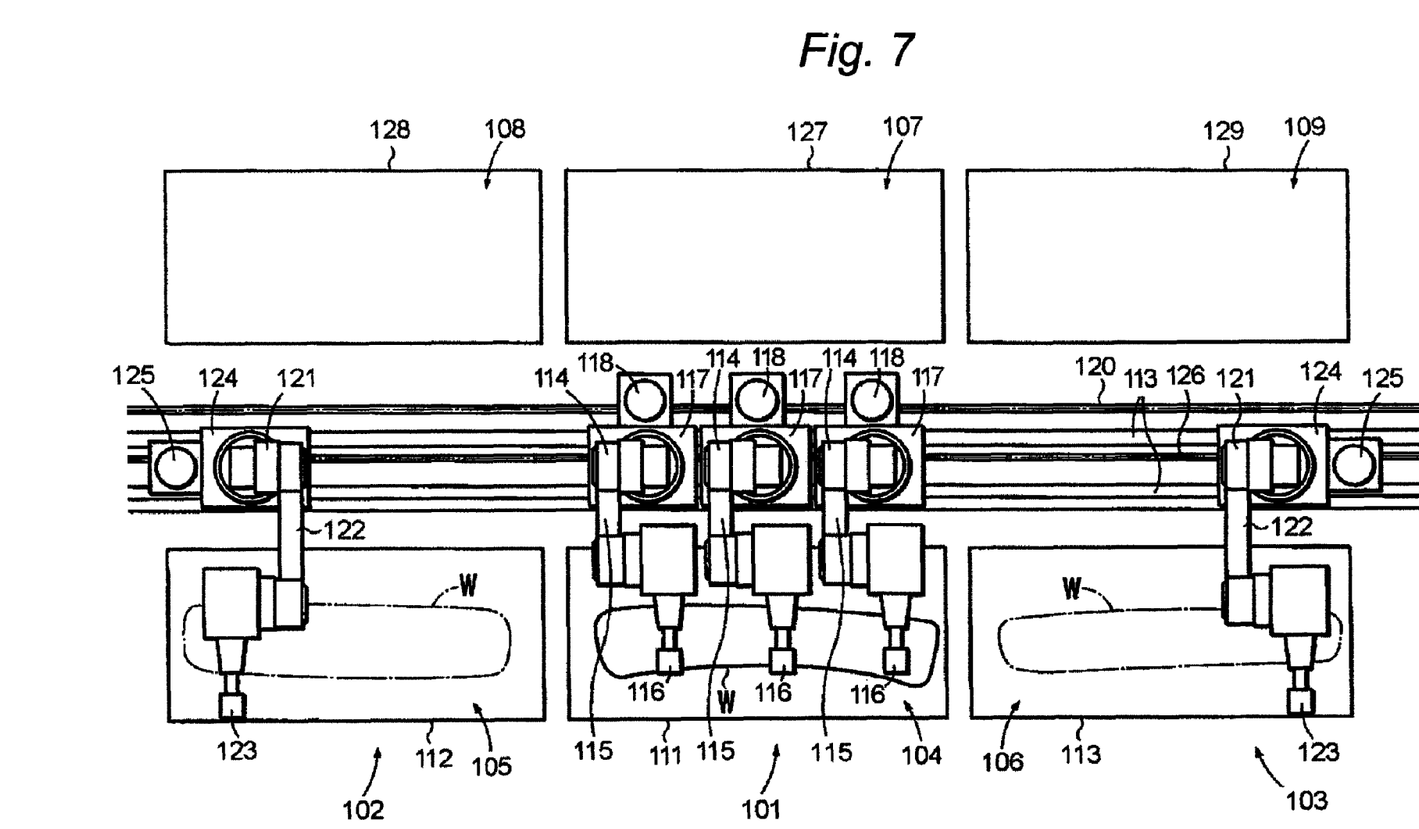
FIG. 7 is an illustrative plan view showing a schematic configuration of an apparatus according to a second exemplary embodiment of the present invention.

A second exemplary embodiment of the present invention will be described based on FIG. 7 to 10C. FIG. 7 is an illustrative plan view showing a schematic configuration of an apparatus according to the second exemplary embodiment, FIG. 8 is an illustrative side view of FIG. 7, FIGS. 9A to 9C are illustrative views schematically showing a work procedure by the apparatus according to the second exemplary embodiment, and FIGS. 10A to 10C are illustrative views schematically showing another work procedure by the apparatus according to the second exemplary embodiment.

As shown in FIG. 7, an assembly apparatus according to the second exemplary embodiment includes a first work station 101 and a second work station 102 and a third work station 103 which are adjacent to both sides of the first work station 101. The work stations 101, 102, and 103 are respectively provided with workpiece loading units 104, 105, and 106 and workpiece unloading units 107, 108, and 109. The work loading units 104, 105, and 106 are respectively provided with workpiece supports 110, 111, and 112 that support different workpieces Ws. Each workpiece W is composed of numbers of workpiece components. The workpiece supports 110. 111, and 112 support their respective workpiece components being in a pre-assembly state.

Guide rails 113 extend along the work stations 101, 102, and 103. A plurality of welding robots 114 (assembly work units) are movably provided on the guide rails 113. In the second exemplary embodiment, although FIG. 7 only shows three welding robots 114 on the upper side, a total of six welding robots 114, i.e., three each on the upper and lower sides, are provided. As shown in FIG. 8, each welding robot 114 includes an articulated arm 115 and a welding gun 116 connected to an end of the articulated arm 115. The welding robots 114 all have substantially the same configuration.

Figure 8:
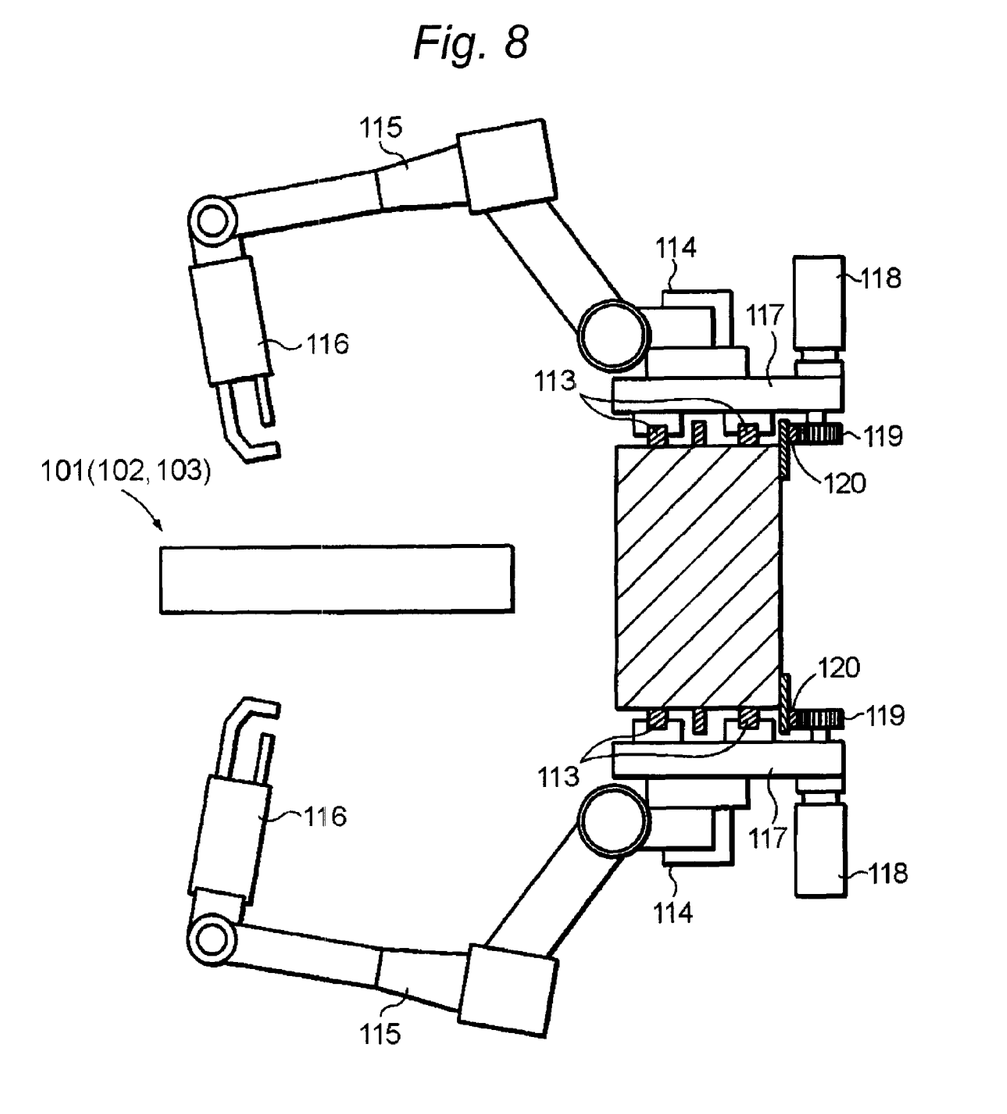
FIG. 8 is an illustrative side view of FIG. 7.

As shown in FIGS. 7 and 8, each welding robot 114 includes a moving stage 117 that slides along the guide rails 113. A drive motor 118 is provided on the moving stage 117 of the welding robot 114. As shown in FIG. 8, a pinion gear 119 is provided to a rotating shaft of the drive motor 118. The pinion gear 119 meshes with a rack 120 extending along the guide rails 113. The welding robots 114 can move along the guide rails 113 independently of one another by driving the respective drive motors 118.

Each welding robot 114 welds predetermined locations of workpiece components supported by a corresponding one of the workpiece supports 110, 111, and 112 by a corresponding welding gun 116 to assemble the workpiece components into a workpiece W. The welding and assembling work and movement of the welding robots 114 are controlled by a control apparatus (not shown). The control apparatus is configured by a microcomputer, etc., and controls the welding robots 114 by a pre-set work procedure.

Also, as shown in FIG. 7, two unloading robots 121 (unloading units) are provided on the guide rails 113. Each unloading robot 121 includes an articulated arm 122 and a grasping finger 123 connected to an end of the articulated arm 122. Though detailed depiction of the grasping fingers 123 is omitted, each grasping finger 123 has a shape that enables to grasp a workpiece W supported by the workpiece support 110, 111, or 112. As with the welding robots 114, each unloading robot 121 includes a moving stage 124 that slides along the guide rails 113. The moving stage 124 of the unloading robot 121 is also provided with a drive motor 125. A pinion gear (not shown) provided to a rotating shaft of the drive motor 125 meshes with a rack 126 extending along the guide rails 113, whereby movement of the moving stage 124 is driven. Each unloading robot 121 transfers a workpiece W grasped from the workpiece support 110, 111, or 112, onto a corresponding one of discharge tables 127, 128, and 129 respectively provided to the workpiece unloading units 107, 108, and 109.

Each of the workpiece supports 110, 111, and 112 supports a workpiece W so as to grasp a part of the workpiece W such that welding locations on the top and bottom sides of the workpiece W are exposed. Each of the workpiece supports 110, 111, and 112 includes a reciprocating unit (not shown) and thus can reciprocate its workpiece components from a set position to a welding work position.

Next, the operation of the assembling apparatus according to the second exemplary embodiment which is configured in the above-described manner will be described. First, workpiece components to be set on the workpiece supports 110, 111, and 112 are selected such that a total amount of time including an amount of time required for setting work and an amount of time required for welding and assembling for workpiece components at one work station is equal to a total amount of time including amounts of time required for welding and assembling work at all work stations. That is, workpiece components to be set on the workpiece supports 110, 111, and 112 are selected such that a work cycle (one cycle from the setting of workpiece components to the completion of assembly) is performed with an equal amount of time among the work stations 101, 102, and 103.

Figure 9A:
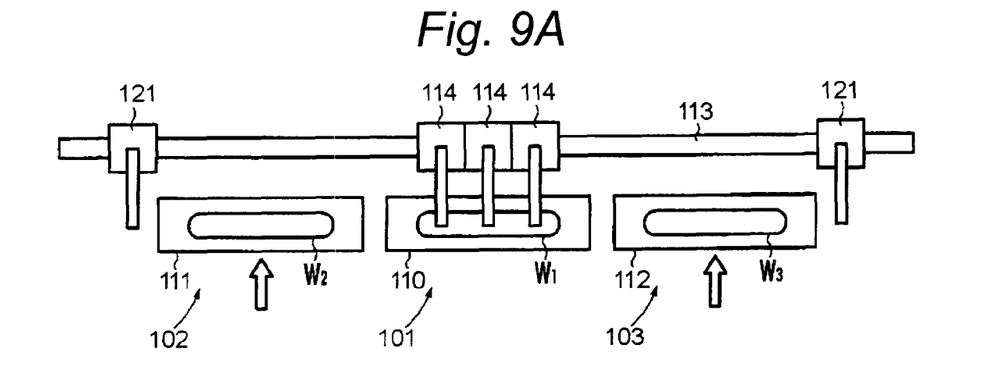
FIGS. 9A to 9C are illustrative views schematically showing a work procedure by the apparatus according to the second exemplary embodiment.
Figure 10A:
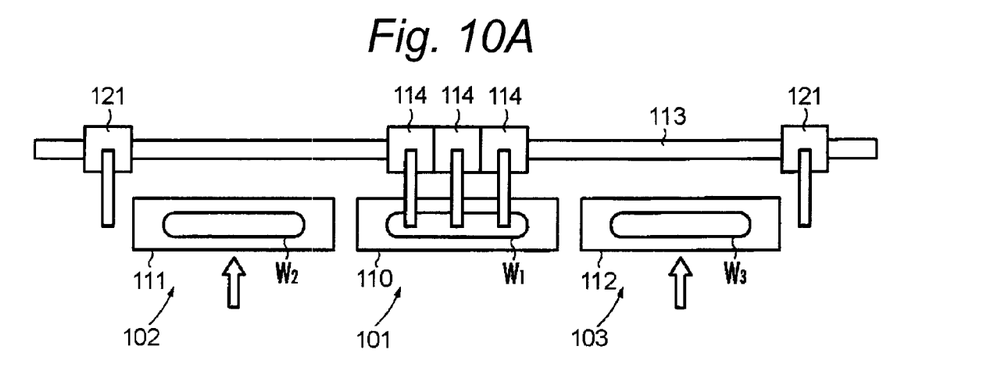
FIGS. 10A to 10C are illustrative views schematically showing another work procedure by the apparatus according to the second exemplary embodiment.
Figure 10B:
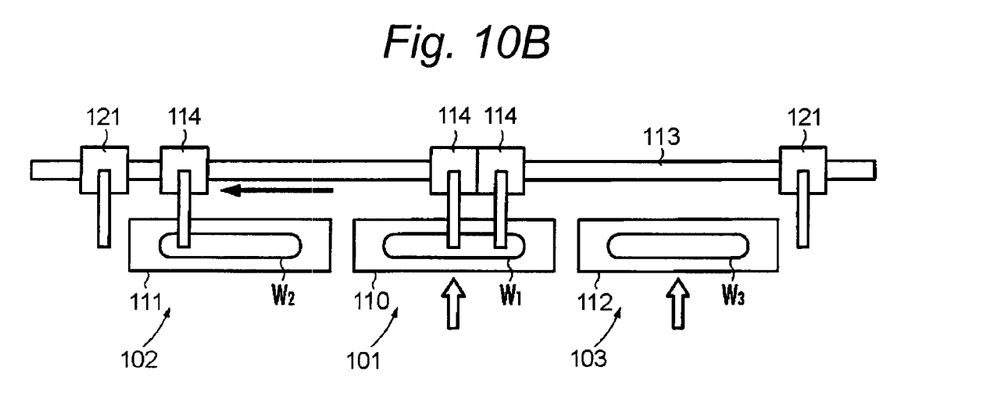
Figure 10C:
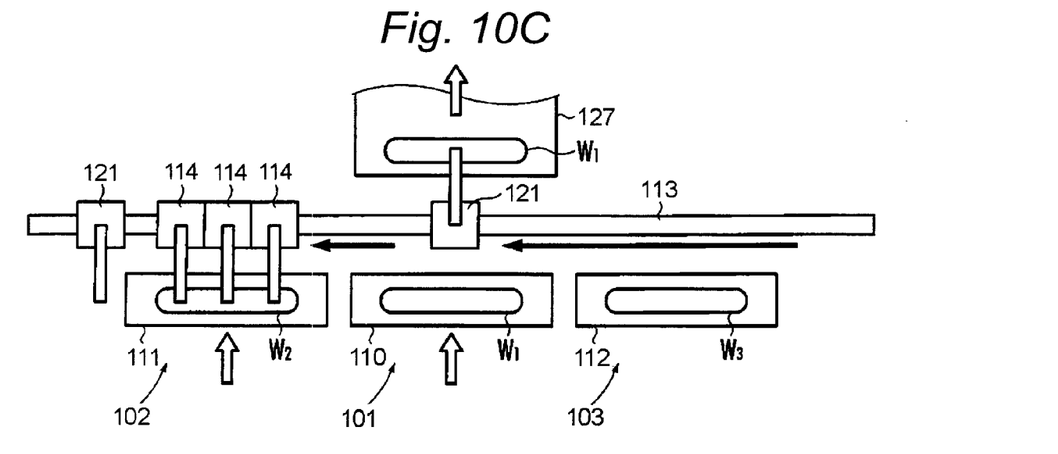

As shown in FIG. 9A, when the welding robots 114 weld and assemble a workpiece $W_1$ supported by the workpiece support 110 at the first work station 101 (assembly step), workpiece components are set on the workpiece supports 111 and 112 at both the second work station 102 and the third work station 103 (workpiece setting step). Then, at the point in time when the welding and assembling work at the first work station 101 is completed, at the second work station 102 the setting work of workpiece components on the workpiece support 111 is completed, and at the third work station 103 the setting work of workpiece components on the workpiece support 112 is continuously performed.

Figure 9B:
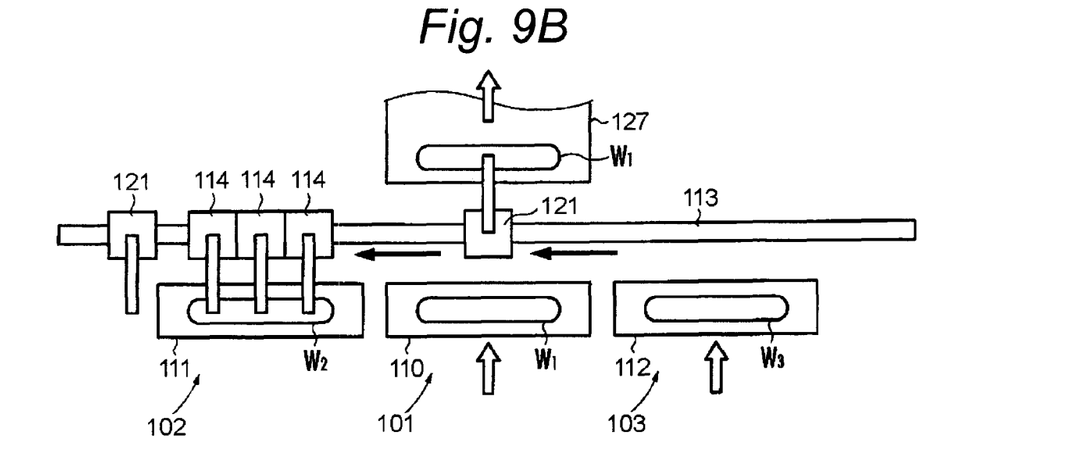

Then, as shown in FIG. 9B, when the welding and assembling work at the first work station 101 is completed, the welding robots 114 move to the second work station 102 (moving step) and the welding robots 114 weld and assemble a workpiece $W_2$ supported by the workpiece support 111. During this period, one of the unloading robots 121 moves to the first work station 101 to transfer the workpiece $W_1$ whose assembly is completed onto the discharge table 127 and then moves back to its original position and goes into a standby state. Then, setting work of workpiece components on the workpiece support 110 from which the workpiece $W_1$ has been unloaded is performed.

Figure 9C:
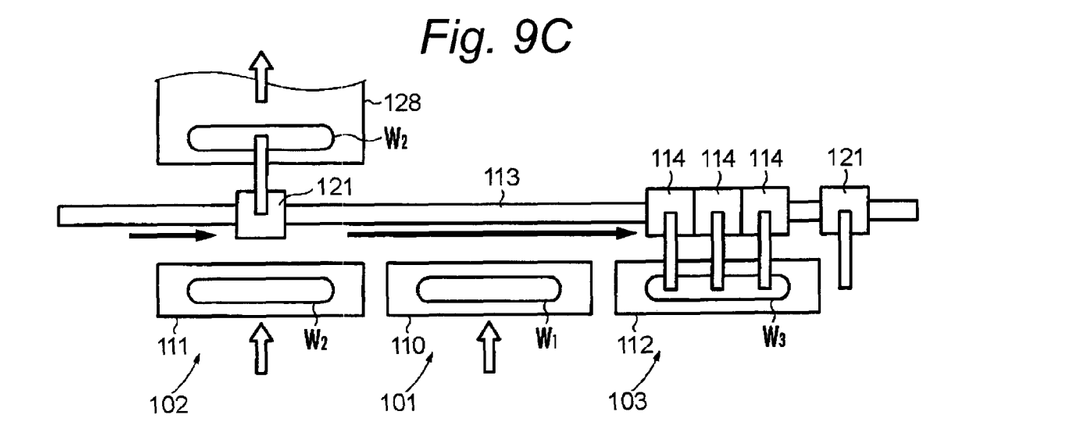

Subsequently, as shown in FIG. 9C, when the welding and assembly work at the second work station 102 is completed, the welding robots 114 move to the third work station 103 and the welding robots 114 weld and assemble a workpiece $W_3$ supported by the workpiece support 112. At the point in time when the welding and assembling work at the second work station 102 is completed, at the third work station 103 the setting work of workpiece components on the workpiece support 112 is already completed, and at the first work station 101 the setting work of workpiece components on the workpiece support 110 is continuously performed. Also, at this time, the other unloading robot 121 moves to the second work station 102 to transfer the workpiece $W_2$ whose assembly is completed onto the discharge table 128 and then moves back to its original position and goes into a standby state. Then, setting work of workpiece components on the workpiece support 111 from which the workpiece $W_2$ has been unloaded is performed.

By repeating the above-described work, assembling work and loading work at all of the work stations 101, 102, and 103 can be performed in one cycle (in a total amount of time required for welding and assembling work and movement by the welding robots at all of the work stations). Thus, the amount of time during which the welding robots 114 go into a non-operating state can be reduced, enabling to efficiently assemble workpieces.

Also, in one cycle, workpieces that differ among the work stations 101, 102, and 103, i.e., a workpiece that requires a great amount of time for setting and a workpiece that requires a great amount of time for welding and assembling work, can be combined. By this too, assembly of differing workpieces can be efficiently performed.

In the second exemplary embodiment, six welding robots 114 on the upper and lower sides can move independently of one another by their respective moving stages 117. Hence, prior to the completion of assembly work at one of the work stations 101, 102, and 103, some of the welding robots 114 can move to another work station to start welding and assembling work.

Specifically, as shown in FIG. 10A, when at the first work station 101 the welding robots 114 weld and assemble a workpiece $W_1$ supported by the workpiece support 110, setting work of workpiece components on the workpiece supports 111 and 112 is performed at both the second work station 102 and the third work station 103.

Then, as shown in FIG. 10B, before the welding and assembling work at the first work station 101 is completed and at the point in time when the setting work of workpiece components on the workpiece support 111 at the second work station 102 is completed, one of the welding robots 114 moves to the second work station 102 to start welding and assembling work. During this period, at the third work station 103 the setting work of workpiece components on the workpiece support 112 is continuously performed.

Subsequently, as shown in FIG. 10C, when the welding and assembling work at the first work station 101 is completed, other welding robots 114 move to the second work station 102 to weld and assemble together with the welding robot 114 that has started the work earlier. As such, since some of the welding robots 114 can move to another work station to start welding and assembling work, the amount of time during which the welding robots 114 go into a non-operating state can be more securely reduced, enabling to dramatically improve the efficiency of assembly of workpieces.

Although in the second exemplary embodiment description is made using the welding robots 114 as assembly work units that assemble the workpieces at each work station, the configuration is not limited to welding and assembling; other processes such as a processing process and a coating process for workpieces can be adopted.

Although the second exemplary embodiment describes an assembling apparatus including three work stations 101, 102, and 103, a larger number of work stations than three may be included and accordingly the number of welding robots 114 may be increased. Furthermore, although the second exemplary embodiment describes linear guide rails 113, oval guide rails may be provided. In this case, a plurality of welding robots 114 may be provided on the oval guide rails so as to be individually movable and a plurality of work stations may be provided along the oval guide rails.

While the present inventive concept has been shown and described with reference to certain exemplary embodiments thereof, it will be understood by those skilled in the art that various changes in form and details may be made therein without departing from the spirit and scope of the invention as defined by the appended claims.

What is claimed is:

1. An assembling method for a workpiece comprising:
a workpiece setting step of setting a plurality of workpiece components composing the workpiece, on a workpiece support; and
an assembling step of loading the workpiece support, on which the workpiece components are set in the workpiece setting step, into a work station to assemble the workpiece by an assembly work unit, wherein
at least three work stations are provided,
the method further comprises a moving step of selectively moving the assembly work unit to any of the work stations,
the assembling step is performed at the any of the work stations by the assembly work unit having been moved in the moving step,
the workpiece setting step is performed at other work stations than the work station where the assembling step is performed, and
in the moving step, the assembly work unit is caused to move to another work station where the workpiece setting step is completed at a point in time when the assembling step at the work station is completed.

2. The assembling method according to claim 1, wherein
in the workpiece setting step, components of a workpiece that differs among the work stations are set on a corresponding workpiece support.

3. The assembling method according to claim 2, wherein
the workpiece components set on the workpiece supports in the workpiece setting step are selected such that a total amount of time including an amount of time required for a workpiece setting step and an amount of time required for an assembling step at one work station is equal to a total amount of time including amounts of time required for assembling steps at all of the work stations.

4. An assembling apparatus for a workpiece comprising:
a workpiece support which supports a plurality of workpiece components composing the workpiece;
at least three work stations into which the workpiece support is loaded;
an assembly work unit which assembles the workpiece components;
guide rails extending along the work stations;
a moving stage provided to the assembly work unit to cause the assembly work unit to move along the guide rails; and
a control unit which causes the assembly work unit to move, when an assembling work by the assembly work unit is completed at any one of the work stations, to another work station where loading of the workpiece support supporting the workpiece components is completed.

5. The assembling apparatus according to claim 4, wherein
the workpiece support supports components of a workpiece that differs among the work stations.

6. The assembling apparatus according to claim 4, wherein
a plurality of assembly work units are provided along the guide rails, each of said assembly work units having a moving stage and being adapted to move, collectively or individually, along the guide rails to the work stations.

* * * * *